(No Model.)
T. KEYWORTH.
PACKING JOINT.
No. 335,592.          Patented Feb. 9, 1886.
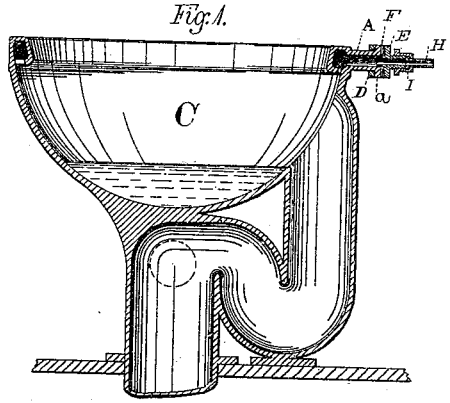
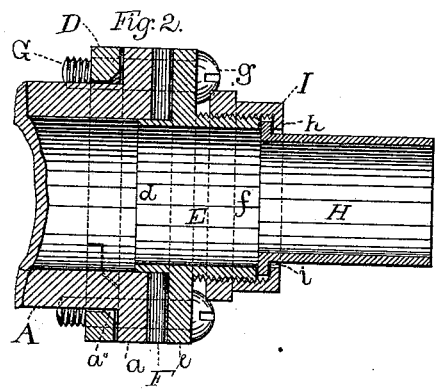
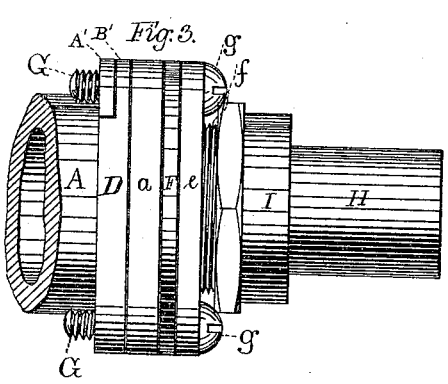
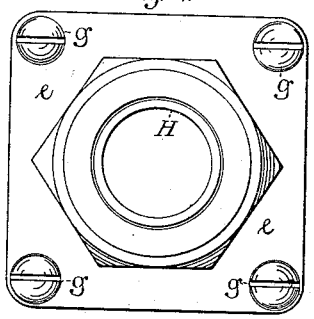
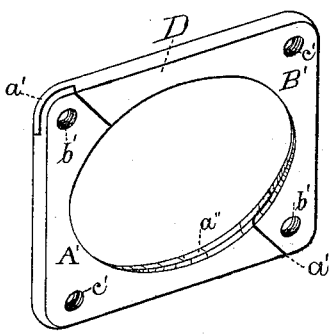
WITNESSES:
INVENTOR
Thomas Keyworth
BY James A Whitney
ATTORNEY

UNITED STATES PATENT OFFICE.

THOMAS KEYWORTH, OF BROOKLYN, NEW YORK.

PACKING-JOINT.

SPECIFICATION forming part of Letters Patent No. 335,592, dated February 9, 1886.

Application filed July 19, 1884. Serial No. 138,272. (No model.)

*To all whom it may concern:*

Be it known that I, THOMAS KEYWORTH, of Brooklyn, in the county of Kings and State of New York, have invented certain Improvements in Packing-Joints, which said improvements have not been patented to others with my consent or knowledge in any country at the time of this my application for Letters Patent of the United States, and which, according to my knowledge or belief, have not been in public use or on sale in the United States more than two years prior to this my said application.

This invention is designed for, among other purposes, the connection of service-pipes to the flanged inlets of porcelain water-closet bowls, such inlets being substantially cylindrical tubes of more or less irregular outline, and provided at their outer ends with circumferential flanges, my invention being also applicable to other cases where it is desirable to connect the pipe or tube to any other pipe or tube provided at one end with a circumferential flange. In the inlets of porcelain water-closet bowls, and also in tubes or pipes made of porcelain, the cylindrical contour is not perfect, and, owing to the exigencies of manufacture, cannot be made of true cylindrical form without greatly increased expense. It is therefore desirable to provide some means whereby a closely-packed or tight connection may be provided between such tubes or inlets and the pipe to be connected therewith, regardless of the eccentricity or irregularity of shape in such inlet or tube. My invention comprises certain novel combinations of parts whereby such an improved result is effectually secured.

Figure 1 is a vertical transverse sectional view of a water-closet bowl and certain of its adjuncts, and illustrating the application of my invention thereto. Fig. 2 is a vertical longitudinal sectional view on a larger scale; Fig. 3, a side view, and Fig. 4 an end view, more clearly illustrating the construction and arrangement of parts included in my said invention. Fig. 5 is a detached perspective view of certain of said parts.

A indicates the inlet or other tube to which the pipe is to be attached, and between which in said pipe the said joint is to be formed, this inlet or other tube being provided at its outer end with the circumferential flange $a$.

When applied to a water-closet bowl C, the inlet or tube A may be applied in the relation illustrated in Fig. 1.

D is a divided collar—that is to say, a collar divided into two parts, A' B'. Preferably the division should be made obliquely through two of the corners, as shown at $a'$ in Fig. 5, the ends of each of the two parts being rabbeted to fit over the adjacent and similarly-constructed ends of the other part, as indicated at said corners $a'$ in said Fig. 5. Bolt-holes $b'$ are formed through the overlapping ends of the two parts A' B', as also shown in said Fig. 5. Similar bolt-holes may be provided at the solid or remaining corner $c'$ of each of the said parts A' B'. The parts A' B' being separable are placed around the inlet or tube A, with the other inner sides in contact with the flange $a$. In said flange $a$ are provided holes coincident with the holes in the several corners of the collar D.

E is a sleeve, which may be constructed with a thimble, $d$, and which has a circumferential flange, $e$. Placed between the flange $e$ of the sleeve E and the flange $a$ of the inlet or other tube A is a packing-ring, F, of india-rubber, leather, or any other suitable material. Formed in the flange $e$ and in the packing-ring F are holes coincident with those in the flange $a$ and with the bolt-holes in the corners of the collar D. Upon the outer end of the sleeve E is an externally screw-threaded thimble, $f$. Bolts G, provided with suitable heads, $g$, are passed through the holes in the flanges $e$ and $a$, the packing-ring F, and the bolt-holes in the collar D. These bolts are screw-threaded at their extremities. The bolt-holes $b'$, and also those in the solid corner $c'$ of the parts A' B' of the collar D, are internally threaded to receive the threaded ends of the bolts G, so that the said bolts being passed through the holes hereinbefore described and screwed into or through the internally-threaded bolt-holes of the collar D, draw the said collar snugly against the flange $a$, and simultaneously therewith compress the packing-ring F between the said flange $a$ and the flange $e$, thereby providing a tight joint between the sleeve E and the inlet or other tube A, regardless of any irregularity in the circumferential form of the inlet or other tube A, or any departure from a true cylindrical form in the said inlet or other tube A.

The pipe to be connected with said inlet or other tube A may be of any suitable character, and is indicated at H in the drawings, and is attached to the sleeve E by any usual or appropriate means—as, for example, by means of an internally-threaded flange-nut, I, screwed upon the threaded thimble $f$ of said sleeve E, and having its flange $h$ bearing against the outer side of a flange, $i$, provided externally at and upon the adjacent end of the pipe H, as more fully illustrated in Fig. 2. As a matter of preference, the inner circumference of the collar D may be beveled, as shown at $a''$, in order to avoid contact with any irregularity of the material at the corner or intersection between the base of the flange $a$ and the adjacent longitudinal surface of the inlet or other tube A.

What I claim as my invention is—

1. A joint for porcelain and other tubes comprising the following elements, to wit: a divided collar, D, composed of the overlapping parts A' B', a tube, A, having a circumferential flange, $a$, a sleeve, E, having a flange, $e$, a packing-ring, F, and bolts G, for connecting the said parts, all substantially as and for the purpose herein set forth.

2. The combination of the collar D, composed of the separable parts A' B', rabbeted and overlapped at their ends, and constructed with internally-threaded bolt-holes $b'$, a tube, A, having a circumferential flange, $a$, a sleeve, E, having a circumferential flange, $e$, a packing-ring, F, interposed between the two flanges aforesaid, and bolts G, constructed to be passed through the flanges and packing-ring and to be screwed into the internally-threaded bolt-hole $b'$ of the collar D, all substantially as and for the purpose herein set forth.

3. The combination of the collar D, composed of the separable parts A' B', rabbeted and overlapped at their ends and constructed with internally-threaded bolt-holes $b'$, a tube, A, having a circumferential flange, $a$, a sleeve, E, having a circumferential flange, $e$, a thimble, $d$, and externally-threaded thimble $f$, a packing-ring, F, interposed between the two flanges aforesaid, and bolts G, constructed to be passed through the flanges and packing-ring and to be screwed into the internally-threaded bolt-hole $b'$ of the collar D, all substantially as and for the purpose herein set forth.

THOS. KEYWORTH.

Witnesses:
 JOHN H. FISHER,
 GUNVALD AAS.